UNITED STATES PATENT OFFICE 2,451,579

4-HALOGENOMETHYL-1:8-NAPHTHSULTONES AND A PROCESS FOR THEIR MANUFACTURE

Guido Schetty, Basel, Switzerland, assignor to J. R. Geigy A.-G., Basel, Switzerland, a Swiss firm No Drawing. Application December 10, 1945, Serial No. 634,151. In Switzerland December 12, 1944

8 Claims. (Cl. 260—327)

It has been found that new 4-halogenomethyl-1:8-naphthsultones corresponding to the formula

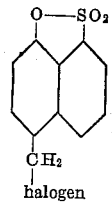

are obtained by interacting naphthsultone with formaldehyde and with a hydrohalogenic acid in the presence of condensation agents. The reaction may be carried out for instance in acetic acid or formic acid in the presence of zinc chloride by introducing hydrogen chloride in a gaseous form at an elevated temperature into the reaction medium.

It is true that in the literature various chloromethylations of aromatic compounds according to the formaldehyde-hydrochloric acid method have already been disclosed. Thus for example naphthalene or methylnaphthalenes may be interacted with formaldehyde and hydrochloric acid in glacial acetic acid thus yielding chloromethyl compounds. Moreover Swiss Patent 200,521 states that α-nitronaphthalene leads to a chloromethyl derivative only when the former is caused to react with formaldehyde and concentrated hydrochloric acid in the presence of zinc chloride.

This reaction has never been applied to aromatic compounds containing sulfonic acid groups; thus it was to be assumed that the said compounds would not react. This supposition was confirmed in that in fact it is impossible to produce a chloromethyl derivative for example with 1-hydroxy-naphthalene-8-sulfonic acid according to the usual chloromethylation methods. Thus it is the more surprising that it is possible to convert the naphthsultone, the internal ester of the 1-hydroxynaphthalene-8-sulfonic acid, into 4-halogenomethyl-naphthsultones, for instance into the 4-chloromethyl derivative, by causing the sultone to react at elevated temperature with formaldehyde in acetic acid and in the presence of zinc chloride while introducing hydrochloric acid gas thereinto, the 4-halogenomethyl-naphthsultones being recovered in an excellent yield. The reaction can be effected also when using a mixture of concentrated acetic acid, concentrated aqueous hydrochloric acid and of an increased quantity of zinc chloride, the yields being, however, somewhat inferior.

Instead of hydrochloric acid it is also possible to use hydrogen bromide, whereby the 4-bromomethyl-naphthsultone is obtained.

The halogen atom present in the 4-halogenomethyl-naphthsultones being reactive, manifold interaction possibilities are given. Thus it may be replaced easily by hydrogen, by a hydroxyl or a substituted hydroxyl group, by an amino or a substituted amino group; by interaction with sulfinic acid salts sulfones will be obtained, whereas on interaction with aromatic compounds according to Friedel-Crafts still otherwise substituted compounds are produced (cf. G. Kränzlein, "Aluminiumchlorid in der organischen Chemie," Verlag Chemie, Berlin, 3rd edition (1939), page 41). These interaction products being naphthsultone derivatives are converted into the salts of correspondingly substituted 1-hydroxynaphthalene-8-sulfonic acids on boiling with dilute alkalis or ammonia.

The 4-halogenomethyl-naphthsultones and their interaction products are valuable intermediate products for the preparation of dyestuffs.

The invention will now be described by the following examples, without being limited thereto; the parts are by weight, unless otherwise stated.

EXAMPLE 1

4-chloromethyl-naphthsultone

Hydrochloric acid in gaseous form is introduced into 525 parts of acetic acid while taking care that no moisture penetrates into the mixture. Then 103 parts of napththsultone, 40 parts of paraformaldehyde and 40 parts of anhydrous zinc chloride are added and the mixture is heated to 70-80° C. while continuously introducing hydrochloric acid gas. The reactants initially suspended are thus dissolved. After 2 hours the introduction of hydrogen chloride is interrupted and the mixture stirred for further 18 hours at 70-80° C. Then while stirring it is allowed to cool down. Thereby the 4-chloromethyl-naphthsultone is separated in a crystalline form. The same is filtered by suction, first washed with some dilute acetic acid and then with cold water until neutral reaction has been reached. Finally it is dried in vacuo at a slightly elevated temperature. Thus 114 parts of 4-chloromethyl-naphthsultone are obtained corresponding to a yield of 99% of the theory. The raw product melts at 144–145° C. In order to obtain the pure compound the raw product is dissolved in 400 parts by volume of chloroform, the impurities are filtered off and the hot filtrate treated with 450 parts by volume of methanol. On cooling the pure product separates in form of compact needles melting after drying at 144.5 to 145.5° C.

When using hydrogen bromide instead of gaseous hydrochloric acid the 4-bromomethyl-naphthsultone is obtained in a corresponding manner, the same melting at 145°–146° C. For obtaining the product zinc bromide instead of zinc chloride is preferably used.

EXAMPLE 2

4-methyl-1:8-naphthsultone 51 parts of chloromethyl-naphthsultone are heated to 65° C. in 200 parts of ethanol, to which have been added 50 parts of concentrated hydrochloric acid. While stirring thoroughly 40 parts of zinc dust are strewn thereinto. During this procedure the mixture begins to boil whereupon stirring is continued under reflux for two more hours at the boiling temperature. It is then cooled down to 5° C., filtered and the residue is extracted by means of chloroform. The chloroform solution is concentrated by evaporation until crystallisation begins to take place, whereupon it is treated with 100 parts of methanol. The white crystalline mass is filtered and dried. In this manner 37 parts of 4-methyl-1:8-naphthsultone melting at 162° C. are obtained, this yield corresponding to 84% of the theory. The same product results from 4-bromomethyl-1:8-naphthsultone.

EXAMPLE 3

4-methyl-1-hydroxynaphthalene-8-sulfonic acid 220 parts of 4-methyl-1:8-naphthsultone are stirred in 1500 parts of water and, after addition of 103 parts by volume of 10 N caustic soda lye, heated to boiling for half an hour. A slightly greenish solution is formed which is filtered while still hot in order to separate residues. Then the filtrate is neutralised by means of 3 parts of concentrated hydrochloric acid and finally treated with 180 parts of sodium chloride, whereby the sodium salt of 4-methyl-1-hydroxynaphthalene-8-sulfonic acid is precipitated in form of a thick, white paste. The same is filtered off and dried. The yield is quantitative.

EXAMPLE 4

4-methylol-1:8-naphthsultone 25.5 parts of 4-chloromethyl-naphthsultone are heated for 3 hours in 300 parts of water, the suspended white product being filtered off, dried and recrystallised from 150 parts of chlorobenzene. Thus 18.3 parts of 4-methylol-1:8-naphthsultone melting at 143–144° C. are obtained. The same product results from 4-bromomethyl-1:8-naphthsultone.

EXAMPLE 5

4-(p-tolylsulfone)-methyl-1:8-naphthsultone 76.5 parts of chloromethyl-naphthsultone are stirred in 1000 parts of cold water and after addition of 56 parts of the sodium salt of p-toluene-sulfinic acid the mixture is heated to boiling for 1½ hours. A white voluminous mass is obtained which is filtered off while still hot and thoroughly washed with hot water and finally dried. The raw product (98 parts) is recrystallised from 1400 parts of acetic acid, whereupon 77 parts of the sulfone is obtained in form of concentrically grouped little needles which, after filtration and drying, melt at 215–216° C. The same product results from 4-bromomethyl-1:8-naphthsultone.

EXAMPLE 6

4-benzyl-1-hydroxynaphthalene-8-sulfonic acid 51 parts of 4-chloromethyl-naphthsultone are stirred in 200 parts of benzene and cooled down to 0° C. With exclusion of moisture 32 parts of aluminium chloride are added by portions. With development of hydrochloric acid a clear solution is formed. The temperature is allowed to rise to 20° C., the mixture being stirred for further 24 hours. The reaction mass is poured onto ice, to which has been added 10 parts of concentrated hydrochloric acid. Then the excess of benzene is removed by steam. The raw 4-benzyl-1:8-naphthsultone remains in form of a white plastic mass. It is heated to boiling for several hours in 1500 parts of water containing 80 parts of 50% caustic potash lye. On cooling the potassium salt of 4-benzyl-1-hydroxynaphthalene-8-sulfonic acid is separated quantitatively in a crystalline form. The same is filtered off, washed with 500 parts of a 10% potassium chloride solution and recrystallised twice from 250 parts of boiling water. The yield amounts to 70% of the theory.

When using toluene, xylene, pseudocumene, mesitylene or anisol instead of benzene, the 1-hydroxy-naphthalene-8-sulfonic acids substituted correspondingly in the benzyl radical will be obtained. The potassium salts thereof are by far more difficulty soluble than the potassium salt of 4-benzyl-1-hydroxynaphthalene-8-sulfonic acid. The same product results from 4-bromomethyl-1:8-naphthsultone.

EXAMPLE 7

4-(4'-hydroxy-3'-carboxy)-benzyl-1-hydroxynaphthalene-8-sulfonic acid 127 parts of 4-chloromethyl-naphthsultone are stirred in 435 parts by volume of trichlorobenzene. To this mixture are added 92 parts of salicylic acid methyl ester, whereupon 133 parts of aluminium chloride are introduced while excluding moisture. With self-heating hydrochloric acid gas is developed. Heating is effected to 90° C., whereby a solid mass is formed which is kept for 6 more hours at 90–95° C. Then the reaction mass is decomposed with ice and a little hydrochloric acid and subsequently the trichlorobenzene is distilled off by means of steam. The raw 4-(4'-hydroxy-3'-carbomethoxy)-benzyl-1:8-naphthsultone remains as plastic mass which solidifies on cooling. In order to saponify the carbomethoxy group and the sultone bridge the raw product is heated for several hours to boiling in 660 parts of water containing 200 parts of 50% caustic potash lye. After dissolution of the raw product it is acidified by means of hydrochloric acid until Congo-acid reaction has been reached, the solution being then cooled down to 5° C. The product precipitated in a crystalline form is filtered and for its purification recrystallised from 330 parts of water. Thus 153 parts of the monopotassium salt is obtained, this yield corresponding to 74% of the theory. The same product results from 4-bromomethyl-1:8-naphthsultone.

EXAMPLE 8

4-(4'-hydroxy)-benzyl-1-hydroxynaphthalene-8-sulfonic acid 127 parts of 4-chloromethyl-naphthsultone are thoroughly mixed with 70 parts of dry phenol and heated for 2 hours to 140° C. while stirring and with exclusion of moisture. At 70–80° C. the mixture melts and gives a strong development of gaseous hydrochloric acid. The melt is stirred for further 3 hours at 135-140° C., then dissolved in 250 parts of chlorobenzene and the chlorobenzene as well as the still remaining portions of hydrochloric acid are removed by steam. The 4-(4'-hydroxy)-benzyl-1:8-naphthsultone remains as an oil solidifying on cooling. For the splitting of the sultone bridge the product is melted in 600 parts of hot water, treated with 150 parts by volume of 10 N caustic potash lye and heated to boiling for about a quarter of an hour. The mixture is then treated with hydrochloric acid until Congo-acid reaction has been reached and subsequently the final product is salted out by means of 120 parts of potassium chloride. The potassium salt of 4-(4'-hydroxy)-benzyl-1-hydroxynaphthalene-8-sulfonic acid separates in an oily form. The same is stirred for some time at 95° C., whereby the product becomes crystalline. Finally it is cooled and filtered. In order to purify the same it is dissolved in 500 parts of hot water and precipitated by addition of 65 parts of potassium chloride. The yield is 75-80% of the theory. The same product results from 4-bromomethyl-1:8-naphthsultone.

EXAMPLE 9

*4-piperidino-methyl-1:8-naphthsultone*

25.5 parts of 4-chloromethyl-naphthsultone are introduced while cooling into 50 parts of piperidine. A viscous paste will be obtained, which is maintained for still some time at an elevated temperature. After having washed the cooled raw product by means of water the 4-piperidino-methyl-1:8-naphthsultone is obtained as a plastic mass. When using a highly concentrated aqueous dimethylamine solution, instead of piperidine, the reaction takes place in a similar manner, whereby the 4-(dimethylamino)-methyl-1:8-naphthsultone will be obtained. The same product results from 4-bromomethyl-naphthsultone.

EXAMPLE 10

*Naphthsultone-4-ω-methane-sulfonic acid*

25.5 parts of 4-chloromethyl-naphthsultone are suspended in 100 parts of water. To this mixture are added 15 parts of anhydrous sodium sulfite and the whole is heated for one hour to boiling, treated with 10 parts of sodium chloride and finally, after cooling, the crystallised sodium salt of the naphthsultone-4-ω-methane-sulfonic acid is filtered by suction. The same product results from 4-bromomethyl-1:8-naphthsultone.

EXAMPLE 11

*Dinaphthsultonyl-methane*

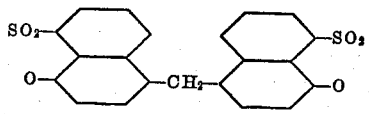

12.5 parts of 4-chloromethyl-naphthsultone, 10.3 parts of naphthsultone and 8 parts of zinc chloride are heated for 15 hours to 80° C. in 100 parts by volume of glacial acetic acid. The so-formed crystalline body is filtered still hot, washed with water and dried. The yield is almost quantitative. When dissolving this product in 70 parts by volume of nitrobenzene and adding equal parts by volume of alcohol one obtains the dinaphthsultonyl-methane in white needles melting at 288-289° C. The same product results from 4-bromomethyl-1:8-naphthsultone.

What I claim is:

1. Process for the manufacture of 4-halogenomethyl-1:8-naphthsultones comprising reacting naphthsultone with formaldehyde and a hydrohalogenic acid in presence of a condensing agent.
2. Process for the manufacture of 4-chloromethly-1:8-naphthsultone comprising reacting naphthsultone with formaldehyde and hydrochloric acid in presence of a condensing agent.
3. Process for the manufacture of 4-bromomethyl-1:8-naphthsultone comprising reacting naphthsultone with formaldehyde and hydrobromic acid in presence of a condensing agent.
4. Process for the manufacture of 4-chloromethyl-1:8-naphthsultone comprising reacting naphthsultone with formaldehyde and hydrochloric acid in presence of zinc chloride.
5. Process for the manufacture of 4-bromomethyl-1:8-naphthsultone comprising reacting naphthsultone with formaldehyde and hydrobromic acid in presence of zinc bromide.
6. The 4-halogenomethyl-1:8-naphthsultones of the general formula

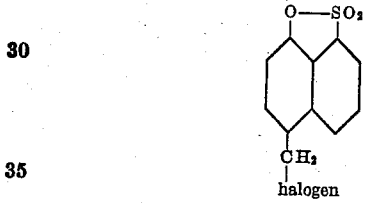

wherein halogen means a member selected from the group consisting of chlorine and bromine.

7. The 4-chloromethyl-1:8-naphthsultone of the formula

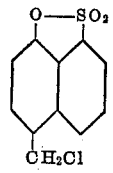

8. The 4-bromomethyl-1:8-naphthsultone of the formula

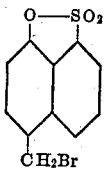

GUIDO SCHETTY.

REFERENCES CITED

The following references are of record in the file of this patent:

UNITED STATES PATENTS

| Number | Name | Date |
|---|---|---|
| 2,359,730 | Schetty | Oct. 3, 1944 |

OTHER REFERENCES

Organic Reactions, vol. 1, page 64, John Wiley & Sons, Inc., New York, 1942.